Oct. 11, 1927.

M. A. BARBER 1,644,975

AUTOMATIC TRAIN PIPE CONNECTER

Filed Oct. 18, 1922  5 Sheets-Sheet 2

INVENTOR
Martin A. Barber
By Bates & Macklin,
ATTYS

Oct. 11, 1927.
M. A. BARBER
1,644,975
AUTOMATIC TRAIN PIPE CONNECTER
Filed Oct. 18, 1922    5 Sheets-Sheet 3
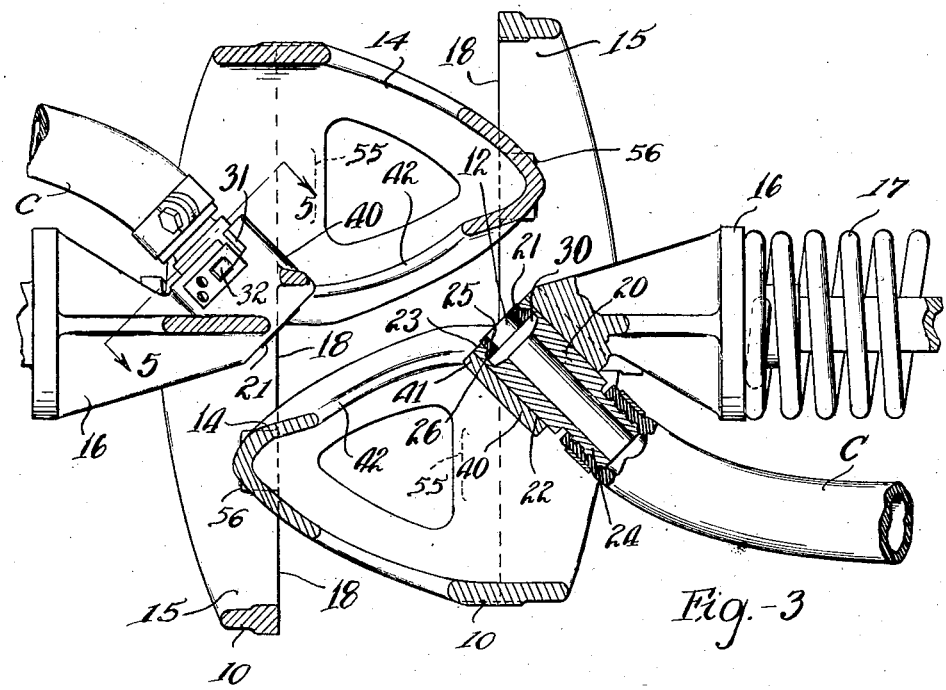
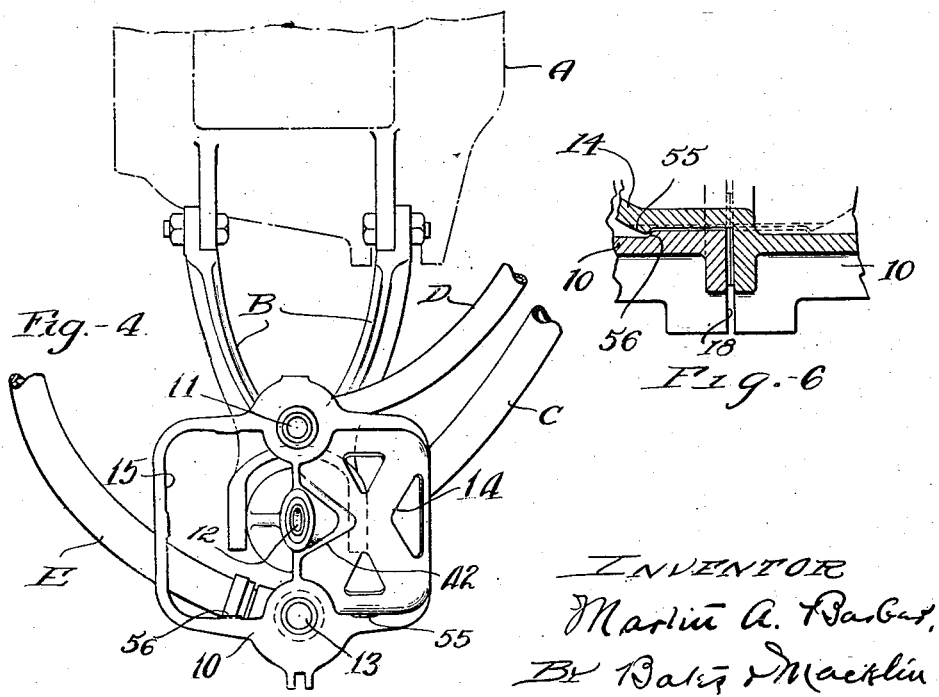

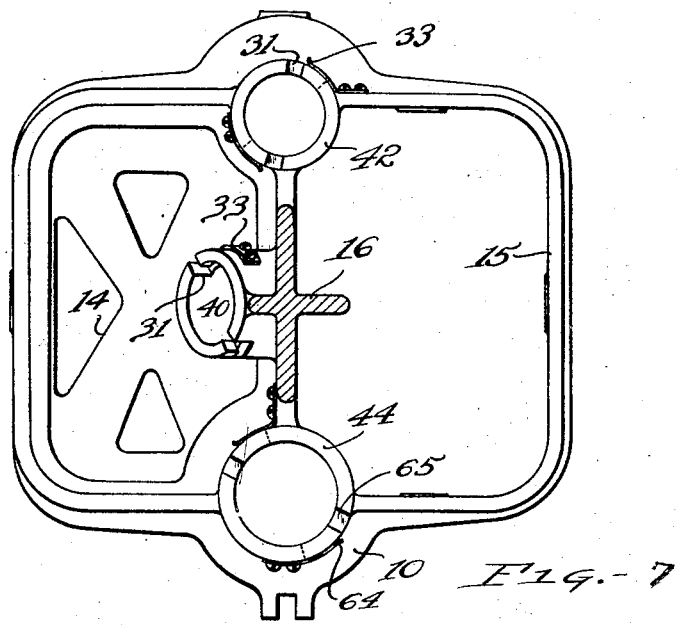
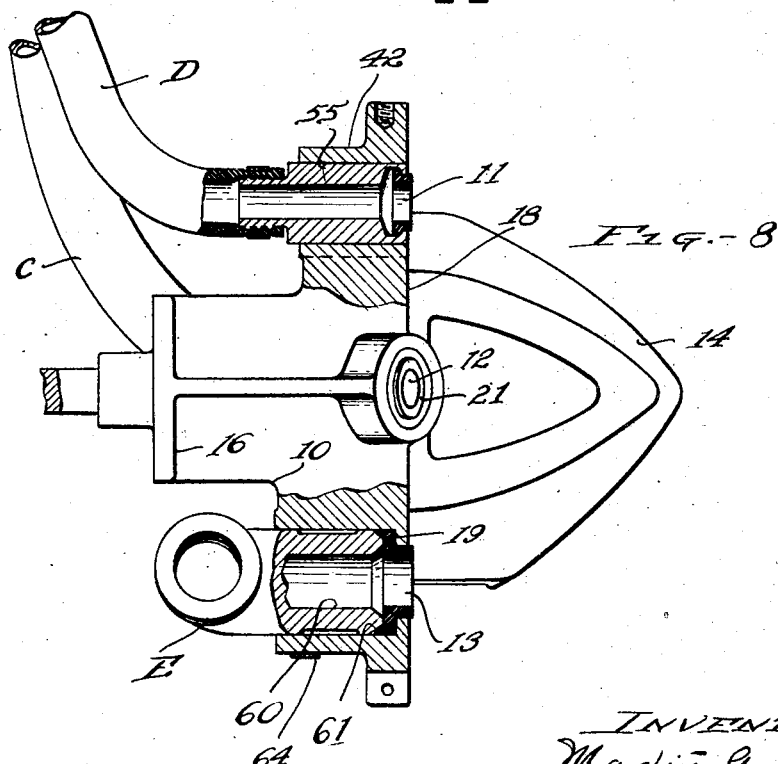

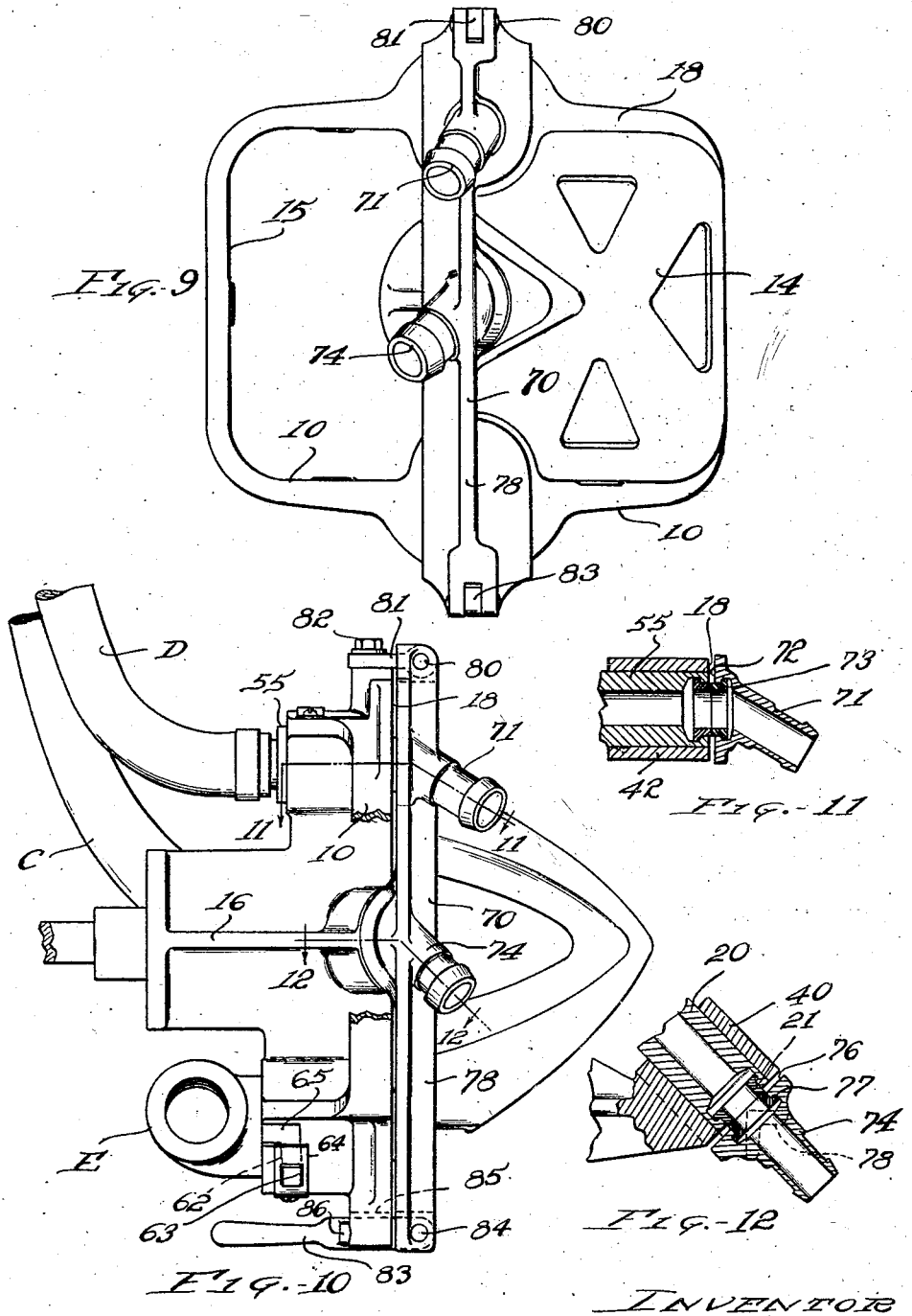

Patented Oct. 11, 1927.

1,644,975

UNITED STATES PATENT OFFICE.

MARTIN A. BARBER, OF CLEVELAND, OHIO.

AUTOMATIC-TRAIN-PIPE CONNECTER.

Application filed October 18, 1922. Serial No. 595,282.

This invention relates to improvements in automatic train pipe connecters. These improvements are well adapted for use in various forms or types of connecters, but I have illustrated it in a connecter shown, for instance, in Patent No. 1,161,372, granted November 23rd, 1915, to M. A. Barber and his assignees. Briefly, this patent shows an automatic connecter having a spring pressed coupler head supported by the draw bar of a coupler, the head being provided on one side with a projection and on the other side with a recess.

One of the improvements set forth in my invention is the provision of a removable nipple for enabling a gasket to be replaced without uncoupling connected heads.

Another object is to arrange the fluid conduit within the associated heads in a substantially straight line, instead of the usual tortuous passageways, thus reducing the period of time required to sufficiently vent the train pipe to apply the brake.

A more specific object is the arrangement of a fluid passageway which extends through the head obliquely to the meeting face thereof without increasing the spread of the head and without interfering with the normal coupling action under various extreme conditions, and which is so arranged that it will not be obstructed by snow or ice.

Still another object is an improved means for tilting connecter heads prior to uncoupling for releasing a lock formed by co-operating shoulders, on mating heads, such a lock being shown, described and claimed in my co-pending application, Serial No. 518,803, filed November 17, 1921.

The means for carrying out these and other objects will be hereinafter fully set forth in the following description which pertains to the accompanying drawings, and the essential characteristics will be summarized in the claims.

Figure 1:
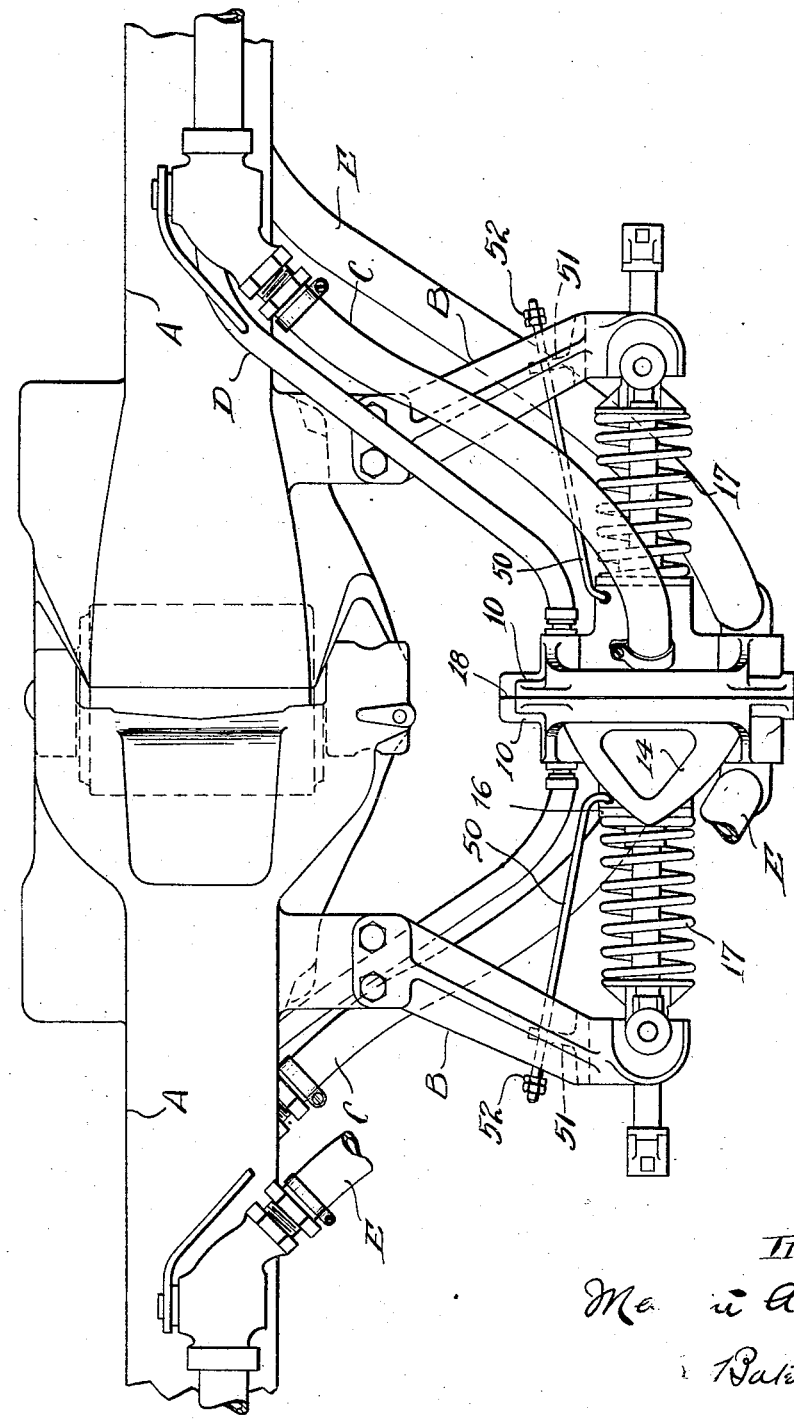
Figure 2:
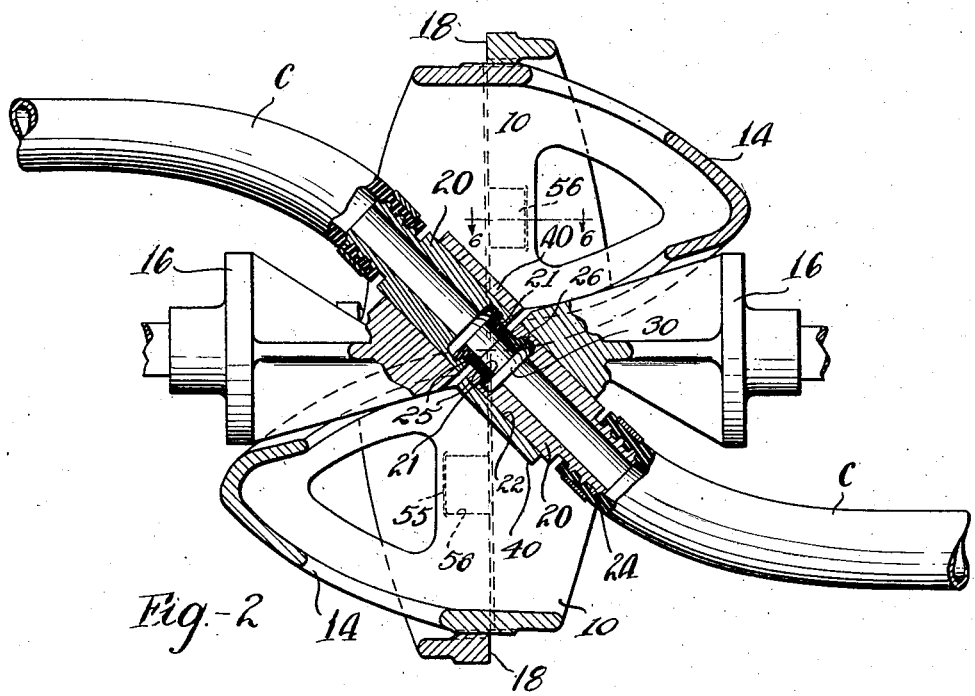
Figure 5:
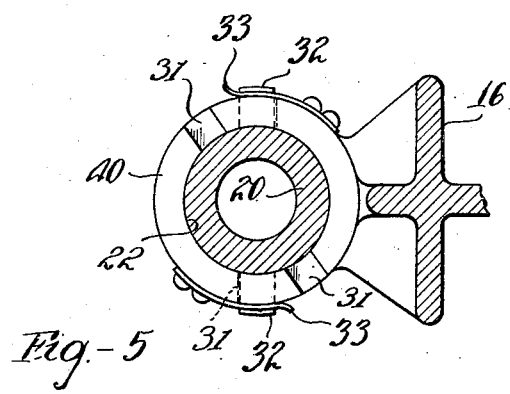

In the drawings, Fig. 1 is a side elevation of my automatic connecters on the adjacent ends of two coupled cars; Fig. 2 is a section taken on a horizontal plane of two connected heads; Fig. 3 is a similar section showing the heads in the act of being coupled or uncoupled; Fig. 4 is a front view of the connecter head in uncoupled position; Fig. 5 is a section taken on the line 5—5 in Fig. 3; Fig. 6 is a detail in vertical section through the lower portion of locked couplers showing the locking shoulders; Fig. 7 is a vertical section through the shank of the connecter, showing the head in rear elevation; Fig. 8 is a sectional side view of one of the connecters; Fig. 9 is a face view of the connecter with an interchange device applied thereto, enabling connection to a car not equipped with an automatic connecter; Fig. 10 is a side elevation, partly broken away, showing the head with the interchange device applied; Figs. 11 and 12 are sections in the correspondingly numbered lines on Fig. 10.

In the various figures, A indicates a railway car coupler having provision for supporting a bracket B depending therefrom, which bracket is employed for carrying an automatic connecter to which the usual train pipes are secured. In the drawing I have shown only one train pipe C extending to the connecter heads, such pipe being employed for carrying air to operate the brakes though orifices are shown for signal air and steam connecters which would be used on passenger equipment.

The automatic connecter shown has a head indicated generally at 10, with orifices shown at 11, 12 and 13 for the air signal, air brake and steam lines, respectively. The connecter is also provided with a projection 14 on one side of the orifice, and a recess 15 on the opposite side for receiving a corresponding projection on another head. The head, as shown, is provided with a shank 16 which has a slidable and universally movable connection with the bracket B. A strong compression spring 17, surrounding the shank, presses the head longitudinally and forwardly in such manner that the spring is compressed while the heads are coupled.

My connecter is primarily of the butting type wherein the head has a transverse face at right angles to the travel of the car, this butting type having been found to result in much less wear than the lap type, where the coupling and uncoupling cause a rubbing of the gaskets. In the ordinary type, however, of butting connecter, there are troublesome bends in the conduit for the brake air, the orifice of which is in the central region of the head. Such conduit usually passes longitudinally and then laterally and again longitudinally making a tortuous air passageway. Accordingly, in a long freight train, the total friction to the passage of air caused by these bends is very material and retards the venting of the train pipe, with the result that a release of air at the locomotive applies the brakes to the head end of the train materially in advance of their application at the rear end. This is very disadvantageous and has frequently caused wrecks by causing the train to buckle intermediately.

One of the objects aimed at in the present invention is to provide a straight unobstructed air passageway through the coupled connecters and at the same time have these connecters of the butting type, and I accomplish this by providing a connecter with the transverse meeting faces at right angles to the direction of travel and with the orifices for signal air and steam when employed, in substantially the plane of that face, while the intermediate orifice for brake air is inclined at an angle of about 45°, with the vertical diameter of that orifice substantially in the transverse meeting plane of the head.

I recess the inner face of the projection to provide for this positioning of the brake air orifice and by this means am enabled to obtain the three orifices in a vertical row, with their vertical diameters in alignment, though the intermediate one is tipped at an angle to the other two, and at the same time the projection and opening of the head are brought as closely together as possible, thereby reducing the size of the head without reducing its gathering range. Furthermore by making the recess in the inner face of the projection open and continuing that opening alongside of the air conduit, I provide for clearance of snow or ice, which might otherwise obstruct the orifice.

The result of the above construction is that I obtain the advantages of compactness, small size, wide gathering range and perfect meeting which experience has demonstrated to result from the construction of head illustrated in my prior patent, while at the same time I obtain the further advantage of a straight air passageway for the brake air through the connected heads.

My improved construction is shown as embodying a removable nipple 20 which permits a gasket 21, to be removed without uncoupling connected heads. To this end, I provide a nipple having a smooth exterior which is slidably mounted within an opening 22 extending through the connecter head. The opening is shown as extending through an offset portion 40 which is integral with the head and projects forwardly of the shank. The forward edge of the nipple, as at 23 in Fig. 3, may terminate adjacent the meeting face 18 of the head, while the rear portion, as at 24, may project beyond the head and be provided with suitable means for attachment to a train pipe C.

The gasket may be carried by the nipple, as shown in Fig. 3, or by the head, as shown in Fig. 8. In either case, the gasket embodies the usual construction, as indicated by a body portion 25 and a flange portion 26 which engages a suitable shoulder. In Fig. 3 the shoulder is formed by an undercut groove 30, on the interior of the nipple, while in Fig. 8, the shoulder 30ª is formed by the head. The groove 30 is shown as having a width greater than the axial thickness of the flange 26, whereby fluid within the nipple acts upon the opposed gaskets to hold them in engagement with each other. Where the head constitutes the shoulder, however, the gasket is preferably held in place by the nipple as will be hereinafter set forth.

To retain the nipple in engagement with the head and at the same time to permit the ready removal thereof, for replacement of the gasket, I have shown a clamping arrangement in the nature of a bayonet lock formed by an L-shaped slot 31 in the rear portion of the head, and a co-operating lug 32 projecting laterally from the nipple. The co-operating lugs and slots are shown as disposed on opposite sides of the nipple. In this way the nipples may be forced within the head and then turned so as to bring the lugs within the locking portion of the slot. To retain the lugs in this position, I have shown springs 33 which are carried by the head, and are adapted to fit over the projecting ends of the lugs, though other suitable locks may be employed, if desired.

For the reasons heretofore stated, and also to allow ready accessibility to the nipple without weakening the shank, I prefer to position the nipple at an oblique angle to the head, as shown in Figs. 2 to 4. In the form illustrated, the axis of the nipple extends approximately at an angle of 45° to the meeting face 18. With this inclination, the hose C leaves the nipple by a very gradual curve not interfering with the air flow. Furthermore the hose, where it surrounds the nipple extension may be readily grasped by the hand and turned sufficiently to free the nipple.

Referring now to Fig. 1, 50 indicates a rod having one end thereof secured to the head and having the other end thereof passing through an opening in an ear 51, carried by the bracket B. This ear is shown as disposed intermediate the two arms of the bracket, and as having an opening which permits the rod to move readily therethrough in accordance with the movement of the head relative to the bracket. This member 50 holds the heads in proper coupling position. It may also be used for causing the heads to be tilted slightly upon separation, whereby a lock formed by co-acting shoulders (55, 56, Fig. 6) on co-operating heads and recesses, is released.

During uncoupling operation the connecters are retained in coupled position until the springs 17 have been extended their full length, or until a shoulder of the rod 50 engages the ear 51. This shoulder is preferably formed by a nut 52 which may be readily adjusted on the rod, as desired. In practice, the adjusting nuts are so positioned that engagement with the ear is effected before the springs have been entirely released. In this way, the force of the spring tilts the heads sufficiently to release the lock, whereupon as the cars separate the connecter heads become free.

Assuming that two automatic connecters embodying my invention are coupled as shown in Fig. 2, and that it is desired to replace a gasket, then the air is turned off in the train pipe C, and the nipple with the gasket attached is released from the springs 33. The gasket is then replaced whereupon the nipple is inserted within the opening 22 and is locked by the springs, as shown in the dotted line of Fig. 3. This operation is accomplished without uncoupling the cars.

My invention as heretofore set forth, has been described only with reference to a removable nipple on the brake air line. This removable feature, however, is well adapted for use on the signal air and steam line employed in passenger equipment, as shown in Figs. 7 and 8, wherein the signal air conduit is indicated at D while the steam conduit is illustrated at E. The nipple associated with the signal air conduit, however, is shown as carrying a gasket, but the steam conduit is illustrated as being associated with a nipple which does not carry the gasket. The signal air connection is similar to that already described, but the portion 42 of the head receiving the nipple 55 passes straight to the rear over the connecter shank instead of being inclined as in the case of the brake air connection.

The steam gasket is shown as having the usual construction but the means for retaining the gasket is illustrated as an annular shoulder 19 which is formed by an inwardly extending flange integral with the head. To retain the gasket against the head, I have shown the steam nipple 60 as having a diameter of that portion in contact with the gasket smaller than the diameter of the gasket. To obtain this, I chamfer the end as at 61. In this way, as the nipple is forced against the gasket, the gasket material is compressed and forced outwardly into the space behind the chamfered portion whereby leakage of steam around the nipple is prevented.

To secure sufficient pressure for holding the gasket against the head and at the same time to retain the nipple in position, I have shown in Fig. 10, a bayonet lock wherein the arm 62 of the slot 65 in the head-sleeve 44 is tapered slightly toward the meeting face of the head, whereby the nipple is urged forward as the lock 63 is turned to engage the spring 64.

For enabling cars constructed according to my invention to be connected with cars having only the usual hand connections, I have shown an interchange device in Figs. 9 and 10. This device comprises a body 70 equipped with one or more conduits to which ordinary hand connecters (not shown) are attached and with means for holding the body against the face of the connecter in such manner that the interchange conduit or conduits will be in communication with the corresponding conduit or conduits of the automatic connecter. In the embodiment shown, the body 70 is in the form of a bar which for the most part has its rear face in a single plane adapted to lie at right angles to the length of the connecter, while in the central region, the rear face of this bar is formed to extend diagonally so that it may be complementary to the oblique brake air orifice. Thus near its upper portion the bar as formed, is preferably integral with a tubular extension 71 which carries the hose for the signal air hand connecter, this extension inclining downwardly to bring the hand connecter into suitable position for coupling. The rear face of the bar in this region indicated at 72 in Fig. 11, is parallel with the signal air orifice and carries a gasket 73 abutting the signal air gasket. 74 indicates the conduit for the hose for the brake air hand connecter which conduit extends diagonally to the side in substantially the same vertical plane as the brake air nipple, as shown in Fig. 12, though inclining downwardly. The rear face 76 of this portion of the bar is oblique by reason of the edge adjacent the projection 14 of the head being brought forward and the edge adjacent the opening of the head being carried rearwardly. Thus the gasket 77 is held in position to snugly abut the gasket in the brake air orifice. The interchange bar is preferably braced by an upright rib 78 which abuts the conduit 71 and passes along the inner side of the conduit 74.

The body 70 is shown as pivotally mounted at 80 to a link 81, which in turn is pivotally mounted, as at 82, adjacent the top of the head. The connection 80 permits the interchange to be swung in a vertical plane, while the connection 82 permits it to be swung in a horizontal plane, thus providing universal movement. In this way, the interchange when idle may be swung upwardly and backwardly and positioned when inactive, back of the connecter head.

When it is desired to couple a car having an automatic connecter with a car not so equipped, the interchange bar is simply brought onto the face of the head and locked by a link 83 which is pivoted at 84 to the body, and is adapted to be swung upwardly, for engaging a suitable recess 85 in the base of the head. A shoulder 86 on the link results in holding the link in locked position.

When the interchange device is thus clamped to the head, the meeting face 72 adjacent the conduit 71 lies parallel to the portion of the meeting face 18 adjacent the signal air conduit. Similarly, the region adjacent the brake air conduit is inclined as at 76 so as to be parallel with the inclined face of the head adjacent the brake air conduit. Thus an automatic connecter having the peculiar arrangement of the orifice described, may be rigidly connected with a car having the usual hand connections.

I claim:—

1. In a train pipe connecter, the combination of a head having a projection and an opening adapted to receive an opening and a projection respectively on a mating head, said first mentioned head having a cylindrical passageway extending therethrough obliquely to the meeting faces of the heads, and a fluid carrying conduit mounted within said passageway, the meeting faces of the heads being in a plane extending at substantially right angles to the longitudinal direction of the connecter, and the plane of the meeting faces passing through the vertical diameter of the end face of said conduit.

2. In a train pipe connecter, the combination of a head and shank, the head having a projection and an opening adapted to receive an opening and a projection respectively on a mating head, the base of the projection and the base of the opening being in a plane at substantially right angles to said shank, and a straight line passageway leading through the head and having the forward end thereof terminating in an opening which extends obliquely to the plane of the meeting face, half of said opening lying in front of the meeting face plane and the other half lying behind the meeting face plane.

3. In a train pipe connecter, the combination with a connecter head having a shank and having a projection and a cavity on opposite sides thereof for coupling purposes, a straight line conduit extending obliquely from the mid-portion of the head toward the rear thereof, the base of the projection and the base of the cavity being on a plane extending at substantially right angles to the shank, the projection having a recess on the inner side thereof and said conduit being located partially within said recess and extending on both sides of said plane.

4. An automatic train pipe connecter head having three conduits disposed one above another, the top and bottom conduits being substantially parallel, and the middle conduit extending at an oblique angle to a plane passing through the axes of the top and bottom conduits, the orifice of the middle conduit being so positioned on the head that the vertical diameter of the end face of the conduit lies in said plane, said obliquely extending conduit providing a straight line passageway through the head.

5. In a train pipe connecter, the combination of a head having a projection and an opening adapted to receive an opening and a projection respectively on a mating head, the base of the projection and the face of the opening being in a plane at substantially right angles to the length of the connecter and a fluid conduit having an orifice within the head between the projection and opening, said orifice being located obliquely to said plane and being half within a longitudinal recess in the inner face of the projection and in front of said plane and half within the opening and behind said plane, the conduit leading from said orifice in a substantially straight line into the interior of said projection.

6. In an automatic train pipe connecter, the combination with a connecter head having a shank projecting rearwardly of the meeting face thereof, said head having an offset portion extending obliquely to the meeting face, a nipple extending through the offset portion, said nipple having the orifice thereof positioned obliquely to the meeting face, and a gasket carried by the nipple.

7. In an automatic train pipe connecter, the combination with a connecter head having a projection and a recess disposed on opposite sides thereof for coupling purposes, and having a shank projecting rearwardly adjacent the central portion thereof, an offset portion of the head positioned forwardly of the shank and having an opening therein, a nipple extending through the opening, means for removably securing the nipple to the offset portion, the forward end of the nipple terminating substantially flush with the forward face of the offset portion, whereby the orifice of the nipple extends obliquely to the meeting face of the head.

8. In an automatic train pipe connecter, the combination with a connecter head having a projection and a cavity on opposite sides thereof for coupling purposes, a shank extending rearwardly of the head, said head having an oblique offset portion integral therewith, said offset portion projecting both forwardly and rearwardly of the meeting face of the head, a replaceable nipple occupying the offset portion, and having an orifice extending obliquely to the meeting face of said head, and the projection being recessed along its inner side in registration with the portion of said orifice which is in front of the meeting face.

9. In an automatic train pipe connecter, the combination with a connecter head, a bracket for supporting the head, said head having a universally movable connection with the bracket, and having fluid carrying conduits extending therethrough adjacent the mid-portion thereof, the meeting face of said head extending transversely to the direction of car travel, said head having a projection on one side and an opening on the other side of the mid-portion, the projection having a recess adjacent one of said conduits, the last mentioned conduit including a removable nipple, one end of the nipple extending obliquely to the meeting face, one half of the end of said nipple lying within said recess and in front of the meeting face, and the other half being located behind the meeting face.

10. In an automatic train pipe coupler, a coupler head consisting of a frame having a projecting inclined guide at one side thereof, and an opening at the other side, said frame being provided with a train pipe passageway having an aperture located centrally of the frame and between the projecting guide and opening, the guide being recessed about said aperture, a shank extending rearwardly from the frame, and out of line with the passageway, said head having an offset portion extending forwardly of the shank and integral therewith, and a removable nipple extending through the offset portion and communicating with the passageway, said nipple being disposed toward the same side of the shank as that upon which the inclined guide is arranged and having the open end thereof extending obliquely to the meeting face of the head.

11. In a train pipe connecter, the combination with a connecter head having a train pipe aperture therein and being formed with a projecting inclined guide at one side of the aperture and an opening at the other side of the aperture, such inclined guide flanking the top and bottom of the aperture and being recessed at one side of the latter, said aperture lying in a plane extending obliquely to the plane of the meeting face of the head, and said head having a straight line passageway leading rearwardly from the aperture and a removable nipple mounted within said passageway and extending into the recess.

12. In a train pipe connecter, the combination with a connecter head having a train pipe aperture therein, and being formed with a projecting inclined guide at one side of the aperture and an opening at the other side of the aperture, such inclined guide being recessed at one side of the latter, said aperture lying in a plane extending obliquely to the plane of the meeting face and said head having a straight line passageway leading rearwardly from the aperture, a nipple mounted within the passageway, one-half of said aperture being disposed in front of the plane of the meeting face and the other half being disposed behind the plane of the meeting face, said inclined guide flanking the top and bottom of that portion of the aperture which lies in front of the meeting face.

In testimony whereof, I hereunto affix my signature.

MARTIN A. BARBER.